United States Patent

[11] 3,619,442

[72] Inventor William E. Henderson
 Hinsdale, Ill.
[21] Appl. No. 722,384
[22] Filed Apr. 18, 1968
[45] Patented Nov. 9, 1971
[73] Assignee Union Carbide Corporation

[54] METHOD FOR INFLATING COLLAPSED TUBING
 8 Claims, 1 Drawing Fig.
[52] U.S. Cl. .................................................. 264/89,
 18/14, 264/95
[51] Int. Cl. ...................................................... B29c 17/02
[50] Field of Search .......................................... 264/89, 95,
 209, 99; 18/14 A, 14 S

[56] References Cited
 UNITED STATES PATENTS

| | | | |
|---|---|---|---|
| 2,337,927 | 12/1943 | Reichel et al. ................ | 18/14 |
| 2,401,798 | 6/1946 | Reichel ......................... | 264/95 X |
| 2,744,336 | 5/1956 | Milne ............................ | 18/14 A UX |
| 2,987,767 | 6/1961 | Berry et al. .................... | 264/95 |
| 3,346,402 | 10/1967 | Lieberman .................... | 264/209 X |
| 3,363,035 | 1/1968 | Minoru Niihi et al. ........ | 264/95 X |
| 3,413,130 | 11/1968 | Rose .............................. | 264/209 X |

Primary Examiner—Robert F. White
Assistant Examiner—J. H. Silbaugh
Attorneys—Paul A. Rose, John F. Hohmann and Salvatore E. Mitri ABSTRACT: A method for inflating collapsed tubular material without rupturing the material or adversely affecting the elongation and stretch characteristics thereof. In a first embodiment, the collapsed material is fed into a chamber while air is introduced into the interior of the material at a pressure sufficient to maintain the material open by relaxed when inflated. The pressure in the chamber is adjusted to create an increased net internal pressure in the material which causes the material to be inflated. The material is maintained in the chamber under the increased pressure only for that time necessary to inflate the material as the increased pressure would adversely affect the material if maintained therein. In a second embodiment, the air introduced internally of the tubular material is sufficient to inflate the material and the material, once inflated, is fed into a drying-sizing unit wherein the pressure is adjusted to create a lower net internal pressure in the material sufficient to maintain the material inflated but in a relaxed state. The tubular material can be a collagen.

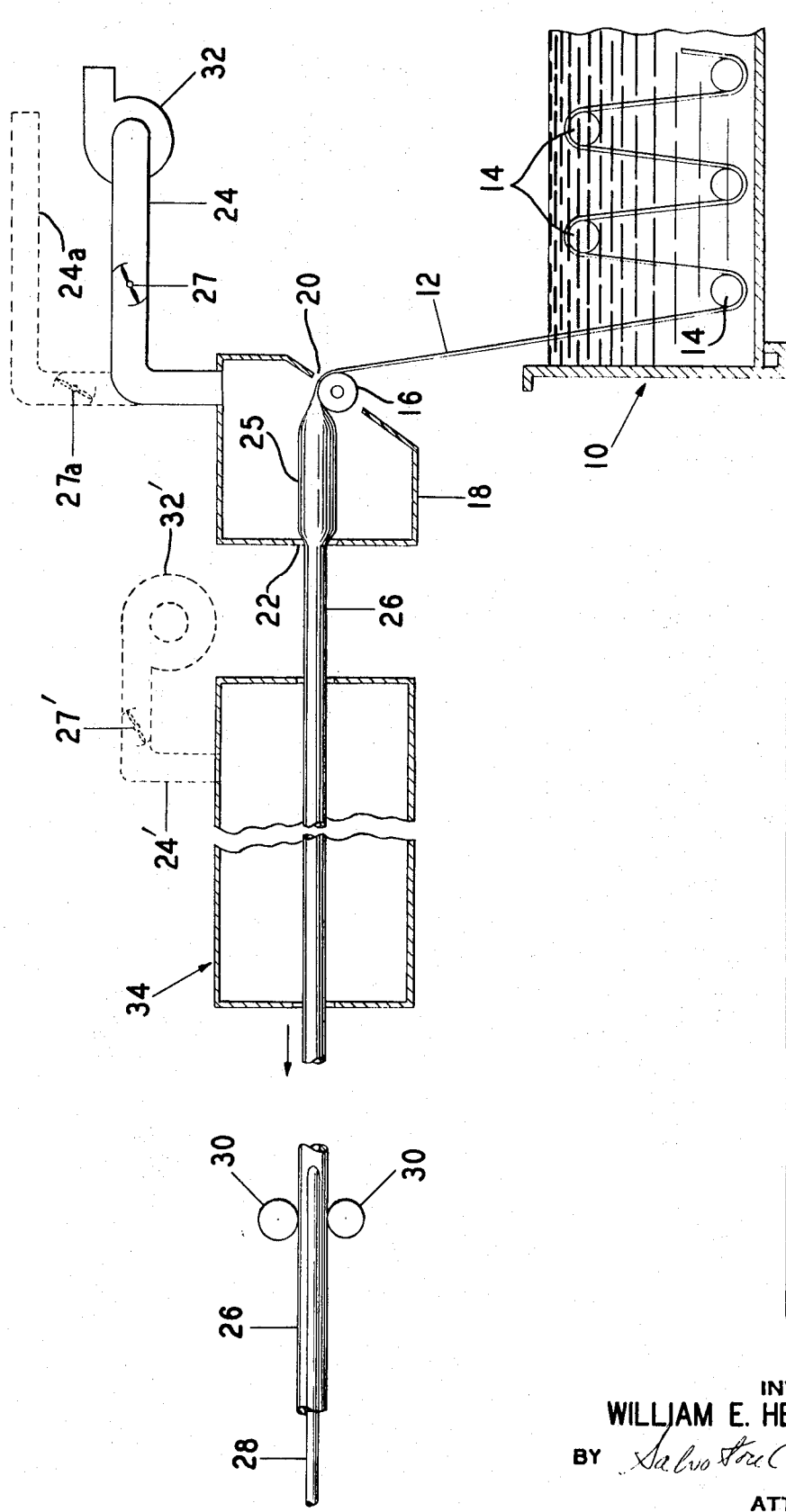
INVENTOR
WILLIAM E. HENDERSON

METHOD FOR INFLATING COLLAPSED TUBING

This invention relates to a method for inflating collapsed tubing after the tubing has been conveyed through liquid treatment baths but before the tubing is advanced for further processing. More particularly, this invention relates to a method for inflating collapsed tubing utilized in the production of food casings.

The tubings to which this invention relates are those generally obtained by the extrusion of such materials as collagen, starches, alginates and the like, and which are usually employed as food casings serving as containers, molds and wrappings for food products encased and processed therein.

In the manufacture of delicate, fragile and tacky tubing such as that obtained from collagen, for example, a continuous length of an extruded, tubular collagenous material is typically inflated with air, partially dried, collapsed and then conveyed through liquid treatment baths where it is subjected to further processing. Upon being advanced out of the liquid treatment baths, the collapsed tubing must be reinflated so that it can be further advanced for subsequent treatment, such as drying and sizing. In the manufacture of food casings, the dried and sized tubing is subsequently shirred, compacted and compressed to obtain relatively short, rigid lengths of tubular, shirred collagen casing sticks.

Further reference to the term "tubular collagen," as used throughout this application and in the appended claims, is intended to refer to and should be understood as referring to tubing obtained from compositions containing collagen and/or material derived or obtained from collagen.

Re-inflating the collapsed tubing to a tubular configuration is necessary as it is conveyed through a conventional dryer-sizer unit and must be accomplished in such a manner that the tubing will not be subjected to excessive stresses which will adversely affect the elongation and stretch characteristics desired to be obtained in the final product. Heretofore, reinflation has been typically accomplished by injecting a stream of air under pressure into the collapsed tubing as it is advanced out of the liquid treatment baths.

When re-inflating a delicate and fragile tubular material such as those obtained from collagen, the use of excessive net internal air pressures, can burst or seriously weaken the wall or can adversely affect the elongation or stretch characteristics of the tubing, particularly as it is being dried and sized. In order to avoid this, relatively low net internal air pressures are used to retain inflated tubular collagen in a tubular configuration. However, because of the tendency of tubular collagen to block, relatively high net internal air pressures must be used just to reopen the collapsed tubing. Once reopened, the net internal air pressure must then be quickly reduced so that the opened tubular collagen can be retained in an inflated tubular configuration without adversely affecting its elongation and stretch characteristics as it is subsequently dried and sized.

The term "net internal pressure," as employed throughout this application and in the appended claims, is intended to refer to and should be understood as referring to the pressure exerted inside or within a tubular material minus the pressure exerted on the outside of the tubular material.

It is an object of this invention, therefor, to provide a method for readily and easily inflating collapsed, tubular materials without rupturing, weakening or adversely affecting the elongation and stretch characteristics of these tubular materials.

This and other objects of the invention will become more apparent from the ensuing discussion.

It has now been found that the objects of this invention can be generally attained by providing means to create a pressure differential between the atmosphere surrounding the outer wall of a collapsed, tubular material and the pressure exerted on the inside of the tubular material. In general, this can be accomplished by providing a chamber equipped with a vacuum pump through which the collapsed, tubular material is conveyed. As the collapsed, tubular material is conveyed through the chamber, air is admitted into it and the atmosphere in the chamber is adjusted to create a pressure differential therebetween which results in a net internal pressure in the collapsed tubing whereby the collapsed tubing can be easily and readily inflated.

The invention will become more clear when considered together with the single, schematic figure comprising the accompanying drawing.

Turning now to the drawing, there is depicted therein a portion of a liquid treatment bath, shown in section and generally indicated by reference numeral 10, through which a continuous length of collapsed, tubular material 12 is conveyed in a zig-zag path over and about a plurality of rolls 14 positioned in the liquid treatment bath 10. Upon being advanced out of the liquid treatment bath 10, the collapsed tubing 12 is trained over roll 16 and advanced to a drying-sizing unit generally indicated by reference numeral 34.

Positioned intermediate the drying-sizing unit 34 and roll 16 is a chamber 18. Chamber 18 is provided with an inlet port 20 and an outlet port 22. A conduit 24, is connected to and communicates with chamber 18 at one end and is connected to a conventional vacuum pump 32 at its other end. Vacuum pump 32 together with a damper 27 in conduit 24 provides the means by which the atmospheric environment in chamber 18 can be obtained and then regulated and controlled. Alternatively, the atmospheric environment in chamber 18 can be regulated and controlled by means of a branch conduit 24a, shown by dotted lines, which leads to the atmosphere and which is provided with a damper 27a.

Reference numeral 26 denotes a length of tubular material inflated to and maintained in a tubular configuration while reference numeral 25 denotes the general configuration of the tubular material at the time it is initially inflated from its collapsed state to a tubular configuration.

In order to prevent the opened, inflated, tubing 25 from coming into contact with the walls of chamber 18 defining inlet port 20, it is preferred that roll 16 be positioned in inlet port 20 so that the collapsed tubing 12 is in contact with and trained about the circumferential surface of roll 16 from about 45° to 180° before it is inflated.

Upon leaving chamber 18, the inflated tubing 26 can be conveyed through a drying-sizing unit 34. In those instances where the inflated tubing 26 is to be shirred, compacted and compressed by a conventional shirring apparatus to obtain shirred casing sticks, it can be advanced over the shirring mandrel 28 of a conventional shirring apparatus by means of a pair of driven rolls 30.

As is known to those skilled in the art, the shirring mandrel 28 can provide the means by which air under pressure can be admitted into the collapsed tubing 12 in order to inflate it as it is conveyed through chamber 18. A typical shirring apparatus which can be utilized in this manner is disclosed and described in U.S. Pat. No. 2,983,949 to Matecki. Other means known to those skilled in the art, such as providing an air nozzle connected to a conventional air supply source, can also be employed to supply inflation air to the inflated tubing 26 and to initially inflate the collapsed tubing 12. The thusly inflated tubing 26 can then be advanced for further processing or collected in windup rolls as desired or required.

A typical operation of the apparatus of the invention will now be described and will be more fully comprehended when considered together with the accompanying drawing. Since tubular materials manufactured from collagen are among the more difficult materials to handle and process, the ensuing description is set forth with particular reference to tubular collagen. However, it should be understood that this is intended merely for the purpose of illustrating the method and apparatus of the invention and is not intended, in any way, to be limitative thereof.

With reference to the drawing, a continuous length of collapsed, tubular collagen 12, is conveyed out of a liquid treatment bath 10, trained over and about roll 16 and advanced through chamber 18. Prior to start up, roll 16 is positioned in inlet port 20 so that the collapsed, tubular collagen 12 is in contact with the circumferential surface of roll 16 from about 45° to 180°. Inflation air, supplied from a conventional air supply source or, as described hereinabove, through the mandrel 28 of a shirring apparatus can now be admitted into the collapsed, tubular collagen 12. At the same time, the atmospheric pressure in chamber 18 is adjusted by means of vacuum pump 32 and damper 27 in conduit 24.

It has been found that a net internal air pressure of from about 2.0 to 3.0 inches water and higher is often necessary to inflate collapsed, tubular collagen. Although an inflation air pressure of this magnitude will serve to initially inflate collapsed, tubular collagen, it has been found that once the tubular collagen has been thusly inflated, this amount of air pressure cannot be maintained without seriously affecting the elongation and stretch characteristics of the tubular collagen. Hence, the higher net internal air pressure at which the collapsed, tubular collagen is initially inflated must be quickly reduced to avoid adversely affecting the properties and characteristics of the thusly inflated, tubular collagen.

Generally, an air pressure of from about 0.7 to 1.2 inches of water has been found to be sufficient to retain tubular collagen in an inflated, tubular configuration as it is advanced for further processing without adversely affecting its characteristics. It is desirable, therefor, to inflate collapsed, tubular collagen under a net internal air pressure that will be sufficient to initially inflate it and then retain the thusly inflated, tubular collagen in an inflated tubular configuration at a substantially lower net internal air pressure.

To accomplish this, air at a pressure of from about 0.7 to 1.2 inches water is admitted into the collapsed, tubular collagen 12 as it enters and is advanced through chamber 18. Simultaneously, air is evacuated from chamber 18 by means of vacuum pump 32 thereby creating a relatively larger pressure differential between the atmosphere outside the collapsed tubular collagen 12 and the air pressure being exerted inside the collapsed, tabular collagen 12. Since an air pressure of from about 0.7 to 1.2 inches water is being introduced into the collapsed tubular collagen 12, the necessary net internal pressure of from about 2.0 to 3.0 inches water can be provided by drawing a vacuum of from about 1.0 to 2.0 inches water in chamber 18 and outside the tubular collagen 12. Under these relative pressure conditions, it has been found that collapsed, tubular collagen 12 can be readily and easily inflated at a lower internal pressure and then be retained in an inflated tubular configuration at the lower internal pressure as it is advanced for further processing without adversely affecting the thusly inflated, tubular collagen 26.

By use of the method and apparatus of the invention, it has been found that collapsed, tubular collagen 12 can be quickly inflated as it enters and is advanced through chamber 18. Upon being initially inflated, the flattened, tubular collagen 12 will have an initial, inflated configuration 25 as indicated in the drawing. As it emerges from chamber 18 through outlet port 22 and is exposed to atmospheric pressure again, the initially, inflated, tubular collagen 25 will assume a more relaxed, inflated, tubular configuration 26. Hence, collapsed tubular collagen 12 need be exposed to the reduced atmospheric environment in chamber 18 only for that duration necessary to initially open and inflate the collapsed tubular collagen 12; that is, pop it open by separating its flattened plies before the initially, inflated, tubular collagen 25 is conveyed out of chamber 18. When inflating collapsed, tubular collagen 12, therefore, it has been found that its residence time in chamber 18 need be only from about 1 to 4 seconds to obtain the initially inflated tubular collagen 25. Hence the distance between the inlet port 20 and outlet port 22 of chamber 18 need only be from about 3 to 12 inches, when the collapsed tubular collagen 12 is being advanced at a linear speed of about 15 feet per minute.

In an alternate embodiment of the invention, chamber 18 can be eliminated and the same results obtained by providing a pressure differential between the atmosphere in the drying-sizing unit 34 and the internal pressure of the tubular material 26. For example, any suitable arrangement of blowers and dampers can be utilized to provide pressures slightly higher within the drying-sizing unit 34 than the atmospheric pressure outside the drying-sizing unit 34. Hence, the drying-sizing unit 34 can be equipped with a pump 32', conduit 24' and damper 27' in the same manner as described hereinabove for chamber 18 and as shown by the dotted lines in the drawing. Collapsed tubular collagen 12 can then be inflated by admitting air into it at a pressure of from about 2.0 to 3.0 inches water. Meanwhile, the drying-sizing unit 34 can be pressurized by means of pump 32 so that the net internal pressure in the thusly inflated tubular collagen 26 will be at about 1.0 inch water as it is conveyed through the drying-sizing unit 34.

In this embodiment, however, it is important to position roll 16 adjacent the inlet of the drying-sizing unit 34 so that inflated tubular collagen 26 is maintained in its initially inflated configuration 25 in the atmosphere and at a net internal pressure of from about 2.0 to 3.0 inches water for only a short period before it enters the drying-sizing unit 34. Preferably, roll 16 is positioned a distance of from about 4 to 8 inches from the inlet of the drying-sizing unit 34. In this manner, although the collapsed tubular collagen 12 is initially inflated at a higher internal pressure, it is retained at this internal pressure level and in its initially inflated configuration 25 as it is popped open for only a few seconds before it enters the pressurized drying-sizing unit 34. Upon entering the pressurized drying-sizing unit 34, the net internal pressure of the inflated tubular collagen 26 is reduced permitting it to relax and be advanced for further processing without adversely affecting its elongation and stretch characteristics.

The invention will become more clear from the following example which is set forth to further illustrate the invention.

EXAMPLE

Two, separate, continuous lengths of tubular collagen fabricated in the same manner were inflated after each had been collapsed and passed through a liquid treatment bath. One length of collapsed, tubular collagen was inflated without adjusting the atmospheric environment in the chamber 18 as the collapsed, tubular collagen was conveyed therethrough while the other length of collapsed, tubular collagen was inflated under a regulated atmospheric pressure maintained in the chamber 18 as it was being conveyed therethrough. The amount of inflation air pressures required to initially inflate each of the lengths of collapsed, tubular collagen are set forth in the table below wherein the letters A and B respectively denote the collapsed tubular collagen inflated without adjusting the atmospheric pressure in the chamber and the collapsed tubular collagen inflated when the atmospheric environment in the chamber was regulated to be under a controlled atmospheric pressure. The values in the table for per cent transverse elongation for each length of tubular collagen were determined by use of an Instron Tensile Tester. The per cent transverse elongation was determined for both lengths of tubular collagen when each was in a "dry" and "wet" state; that is, after being inflated and conveyed through a dryer-sizer unit for the "dry" values and after being inflated and then rewet with water for the "wet" values. Additionally, the ratio of the "wet" burst diameter to the "dry" inflated diameter for each length of tubular collagen was determined according to usual methods and procedures and these values are also set forth in the Table.

TABLE

| | Tubular | Collagen |
|---|---|---|
| | A | B |
| Air pressure in chamber (inches $H_2O$) | 0.0 | −2.0 |
| Inflation air pressure in tubing | 3.1 | 1.2 |
| % Transverse elongation—Dry | 39 | 60 |

| | | |
|---|---|---|
| % Transverse elongation—Wet | 72 | 93 |
| Wet Burst Diameter:<br>Dry Inflated Diameter | 1.27 | 1.43 |

As can be seen from the table above, significantly less inflation air pressure was required to inflate casing B than was required to inflate casing A even though the pressure differential for casing B was slightly higher than for casing A. It can also be seen that casing B exhibited significantly better transverse elongation properties than did casing A. Additionally, casing B exhibited a better ratio of wet burst diameter to dry inflated diameter than did casing A. This ratio is important since it is believed to be indicative of the degree of lateral expansion a length of tubular material will exhibit when it is utilized as a food casing and stuffed with a food item. A tubular food casing which exhibits a high ratio has been observed to be capable of more readily accommodating the food items stuffed therein.

While the method and apparatus of this invention have been described with particular reference to tubular collagen, it should be understood that the invention is also applicable to other tubular materials such as those manufactured from polyolefins, regenerated cellulose and the like.

Hence, although the invention has been described in some detail and with particularity, it should be understood that changes, modifications and alterations can be made therein in addition to those suggested hereinabove without departing from the scope and spirit of the invention.

What is claimed is:

1. A method for inflating a delicate, tacky collapsed tubular material including the steps of:
    a. conveying a length of delicate, tacky collapsed tubular material into a chamber having means to adjust the pressure therein;
    b. admitting air under pressure into the interior of the tubular material as it enters and is conveyed through the chamber, the internal pressure thereby created being sufficient to maintain the tubular material in an inflated condition without rupturing or adversely affecting the elongation and stretch characteristics of the same;
    c. adjusting the pressure within the chamber as the tubular material containing air under pressure is being conveyed therethrough to create a net internal pressure in the collapsed tubular material sufficient to readily and easily inflate the collapsed tubular material, said net internal pressure thereby created being sufficient to rupture or adversely affect the elongation and stretch characteristics of the inflated tubular material if maintained; and,
    d. conveying the inflated tubular material from the chamber such that said net internal pressure is applied to the tubular material while in the chamber for a residence time necessary to inflate the collapsed tubular material and for a residence time less than that in which said net internal pressure would rupture or adversely affect the elongation and stretch characteristics of the inflated tubular material.

2. The method of claim 1 wherein the tubular material is collagen.

3. The method of claim 2 wherein the net internal pressure created is from abut 2.0 to 3.0 inches water and wherein the residence time in the chamber is from about 1 to 4 seconds.

4. The method of claim 2 wherein air is continuously admitted into the interior of the collapsed tubular material at a pressure of from about 0.7 to 1.2 inches water.

5. A method for inflating a delicate, tacky collapsed tubular material without permanent distention thereof including the steps of:
    a. advancing a length of delicate, tacky collapsed tubular material to a point adjacent to the inlet of a drying-sizing unit having means to adjust the pressure therein;
    b. admitting air under pressure into the collapsed tubular material to create an internal pressure therein sufficient to readily and easily inflate the collapsed tubular material, said internal pressure being sufficient to rupture or adversely affect the elongation and stretch characteristics of the inflated tubular material if maintained;
    c. immediately advancing the thusly inflated tubular material containing air under pressure into the drying-sizing unit such that said internal pressure is applied to the tubular material while outside the drying-sizing unit for a time sufficient to inflate the tubular material and for a time less than that in which said internal pressure would rupture or adversely affect the elongation and stretch and characteristics of the inflated tubular material; and,
    d. adjusting the pressure in the drying-sizing unit such that, as the thusly inflated tubular material containing air under pressure enters the drying-sizing unit, the net internal pressure of the inflated tubular material is reduced permitting the inflated tubular material to be conveyed through the drying-sizing unit in an inflated condition without rupturing or adversely affecting the elongation and stretch characteristics of the same.

6. The method of claim 5 wherein the tubular material is collagen.

7. The method of claim 6 wherein the internal air pressure at which the collapsed tubular material becomes inflated is from about 2.0 to 3.0 inches water, said air pressure being admitted into the collapsed tubular material about 4 to 8 inches before entering the drying-sizing unit.

8. The method of claim 7 wherein the net internal pressure of the inflated tubular material as it enters and is conveyed through the drying-sizing unit is from about 0.7 to 1.2 inches water.

* * * * *